(12) United States Patent
Kubicki et al.

(10) Patent No.: US 9,037,585 B2
(45) Date of Patent: May 19, 2015

(54) METHOD AND SYSTEM FOR GENERATING PRIME UNIFORM RESOURCE IDENTIFIERS

(76) Inventors: Kristopher Kubicki, Chicago, IL (US); Lawrence Hsieh, Vancouver (CA)

( * ) Notice: Subject to any disclaimer, the term of this patent is extended or adjusted under 35 U.S.C. 154(b) by 481 days.

(21) Appl. No.: 12/980,669

(22) Filed: Dec. 29, 2010

(65) Prior Publication Data

US 2011/0225181 A1   Sep. 15, 2011

Related U.S. Application Data

(60) Provisional application No. 61/313,636, filed on Mar. 12, 2010.

(51) Int. Cl.
*G06F 7/00* (2006.01)
*G06Q 30/06* (2012.01)
*G06F 17/30* (2006.01)

(52) U.S. Cl.
CPC ...... *G06Q 30/0629* (2013.01); *G06F 17/30887* (2013.01)

(58) Field of Classification Search
USPC .......................................... 707/602, 709, 737
See application file for complete search history.

(56) References Cited

U.S. PATENT DOCUMENTS

| | | | |
|---|---|---|---|
| 8,688,534 B2 | 4/2014 | Kubicki et al. | |
| 2008/0059486 A1* | 3/2008 | Pappas | 707/100 |
| 2009/0089278 A1* | 4/2009 | Poola et al. | 707/5 |
| 2009/0119268 A1* | 5/2009 | Bandaru et al. | 707/3 |
| 2009/0164502 A1* | 6/2009 | Dasgupta et al. | 707/102 |

* cited by examiner

*Primary Examiner* — Khanh Pham
*Assistant Examiner* — Bruce Witzenburg
(74) *Attorney, Agent, or Firm* — Perkins Coie LLP

(57) ABSTRACT

A system and method for mapping an input uniform resource identifier (URI) to an entry in a database. The system cleans an input URI to produce a prime URI that references an entry in a database. The prime URI is created by applying a regular expression determined for a particular domain to the input URI. Once the prime URI is generated, the prime URI can be used to retrieve information from a database.

16 Claims, 5 Drawing Sheets

FIG. 5 — 200

| Name | Seller ID | Domain | Static Base Portion | Regular Expression |
|---|---|---|---|---|
| Amazon.com | 001 | Amazon.com | Amazon.com/dp/ | /dp/([A-Z]{2}[0-9]{8}) |
| Overstock.com | 002 | Overstock.com | • | • |
| Newegg.com | 003 | Newegg.com | • | • |
| Compusa.com | 004 | Compusa.com | • | • |
| ... | | | | |

FIG. 6 — 250

| Product ID | Description | Price | Date | Reseller | Prime URI |
|---|---|---|---|---|---|
| 001 | Lenovo T410s | 1699 | 10/27/10 | Amazon.com | ~ |
| 001 | • | 1650 | 10/25/10 | Newegg.com | ~ |
| • | • | 1720 | 10/21/10 | Overstock.com | ~ |
| 002 | Lenovo T510 | 889 | | | |
| ... | | | | | |

METHOD AND SYSTEM FOR GENERATING PRIME UNIFORM RESOURCE IDENTIFIERS

CROSS-REFERENCE TO RELATED APPLICATION(S)

Present application claims the benefit of U.S. Provisional Application No. 61/313,636 filed on Mar. 12, 2010, which is herein incorporated by reference in its entirety.

TECHNICAL FIELD

The present disclosure relates generally to programmed computer systems and in particular to computer systems that store information associated with Uniform Resource Identifiers (URIs).

BACKGROUND

In many software applications, it is desirable to create and keep a record (e.g., an index) of content that is available on from a site on the Internet. The content may represent different products, coupons, news articles, video clips, social networking information or a variety of other information. In general, each web page that contains the content is referenced by a uniform resource identifier (URI) that defines the specific address for the web page.

One difficulty in creating an index for a web site is that many web pages that contain the same content or show the same product are referenced by different URIs. If each different URI is placed into a database for the web site, the database would quickly become unmanageable. Given this problem, there is a need for a technique that can be implemented by a computer to associate numerous different URIs with a single entry in a database that stores information about content contained in a web page.

SUMMARY

To address the above problems and others, the technology disclosed herein relates to a system and method for associating different uniform resource identifiers (URIs) with information stored in a database. A computer system includes processor electronics configured to receive an input URI and to generate a corresponding new or prime URI. The new URI is used to access information stored in the database. The information can then be provided to a requesting user or other computer program. In one embodiment, the new URI is generated by applying a regular expression associated with a domain of the input URI to the input URI.

In accordance with one embodiment of the disclosed technology, the regular expression for a domain is created by analyzing a set of minimized input URIs, each of which refers to a similar type web page. A regular expression is determined that corresponds to the minimized URIs. In one embodiment, the regular expression for a domain is stored in a database. URIs from the domain of a web site are analyzed with the associated regular expression to determine a corresponding new URI.

In accordance with another embodiment of the invention, a non-transitory computer-readable medium contains instructions that are executable by a computer to direct the computer to receive an input URI having an associated domain from a requester, analyze the received URI with a regular expression that is associated with the domain of the received URI to produce a new URI. From the new URI, information can be retrieved from a database and supplied to the requester.

In yet another embodiment, the disclosed technology relates to a computer-based method for determining information from a database in response to an input URI. A computer is configured to receive an input URI having an associated domain, retrieve a regular expression that is associated with the domain, and apply the retrieved regular expression to the received URI in order to produce a new URI. The computer references an entry in a database based on the new URI.

BRIEF DESCRIPTION OF THE DRAWINGS

FIGS. 5 and 6 show simplified databases that illustrate how a prime URI can be used to access information about a particular item in the database in accordance with an embodiment of the disclosed technology.

DETAILED DESCRIPTION

As indicated above, the technology disclosed herein relates to a method and apparatus for associating a received URI to an entry for a piece of content in a database. The pieces of content may represent products for sale, music or video files for sale or viewing, photographs, reports, message postings, information about individual people or groups on social media pages or any other item or thing that is found on the Internet. In one exemplary embodiment disclosed and described below, the technology is used to store information about products available on buy pages of Internet retailers. However, it would be appreciated by those skilled in the art that the technology is applicable to other uses as well.

As indicated above, one difficulty in creating a database that stores information about a variety of pieces of content shown in the web pages of a host site is the fact that the same piece of content can be referenced by numerous different uniform resource identifiers (URIs).

The following is an exemplary structure of a URI from a web site to be indexed.

http://www.amazon.com/dp/AB1234567/ref code where "http" is a Uniform Resource Name; "www.amazon.com" is the domain of a web site to be indexed; "amazon.com" is the simple or root domain of the web site to be indexed; "www" is the sub-domain attached to the root domain of the web site to be indexed; "/dp/" is a base path or the leftmost characters after the domain that explains to a user the path location of the unique web site ID; and "AB1234567" is a web site ID that has a 1:1 correspondence to a piece of unique content.

The ref code may include a number of extraneous characters that have no bearing on the content referenced by the URI. The root of the URI is the slash "/" immediately following the domain.

As indicated above, any URI may contain extraneous characters such as referral codes, cascade style sheets (CSS), search engine optimization (SEO) codes, anti-botting codes that are designed to defeat or confuse web crawling robots or the like. In one example, the following URIs all refer to the same product at a reseller Amazon.com.

http://www.amazon.com/gp/product/B001ENOZY4/ref=s9 simh qw p23 t2?pf rd m=ATVPDKIKX0DER&pf rd s=center-2&pf rd r=1E6 KH6A49ZMVR9KGYEZS&pf rd t=101&pf rd p=470938631&pf i=507846 http://www.amazon.com/gp/product/B001ENOZY4/ref=s9 simh qw p23 t2?pf rd m=ATVPDKIKX0DER&pf rd s=center-2&pf rd r=1E6 KH6A49ZMVR9KGYEZS&pf rd t=101&pf rd p=470938631&pf i=507846 http://www.amazon.com/gp/product/B001ENOZY4/ref=s9 simh qw p23 t2?pf rd m=ATVPDKIKX0DER&pf rd s=center-2& http://www.amazon.com/gp/product/B001ENOZY4/ http://www.amazon.com/dp/B001ENOZY4/

Without knowing the rules by which each web site selects its URIs, it is difficult to know which part of a URI uniquely refers to a piece of content. Alternatively, if each URI from a web site is simply stored in a database, the database will soon become unmanageable.

Figure 1:
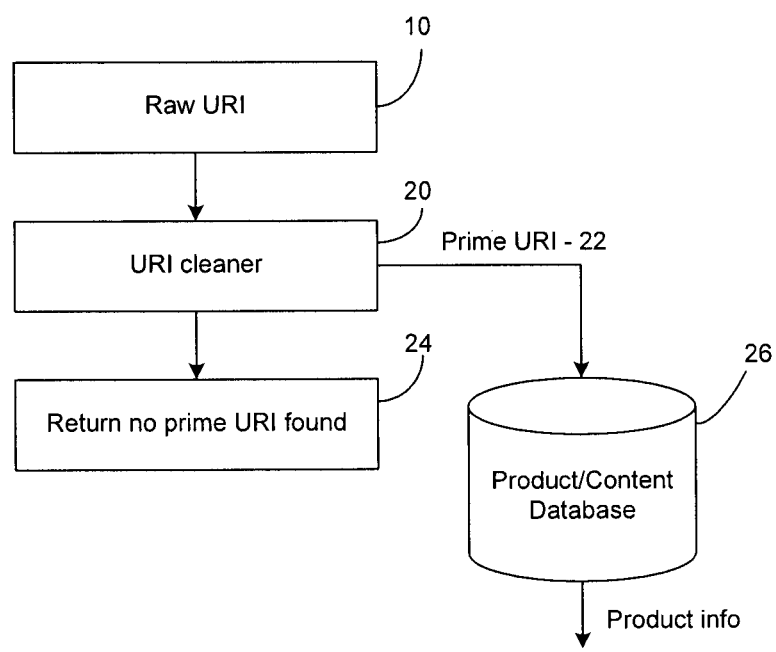
FIG. 1 illustrates a simplified system for associating an input URI with an entry in a database in accordance with an embodiment of the disclosed technology.

To solve this problem, the technology disclosed herein operates to create a new or "prime URI" from any input or raw URI. As shown in FIG. 1, a raw input URI 10 can be received from a user, from other computer programs or from a robot that crawls the Internet for URIs. The raw URI 10 is applied to a URI cleaner 20. The URI cleaner 20 either produces a prime URI 22 or an indication that the input URI does not refer to a unique piece of content or that no prime URI can be created. A prime URI is a URI that cannot be further simplified and still refer to the same piece of content.

Once the prime URI is known, the prime URI can be used to look up or store information about the unique piece of content in a product or content database 26. The information about the product or content can be returned to the user or program who supplied the input URI. Alternatively, the prime URI can be used to store additional or updated information about the unique content referenced by the prime URI in the database 26.

Figure 2:
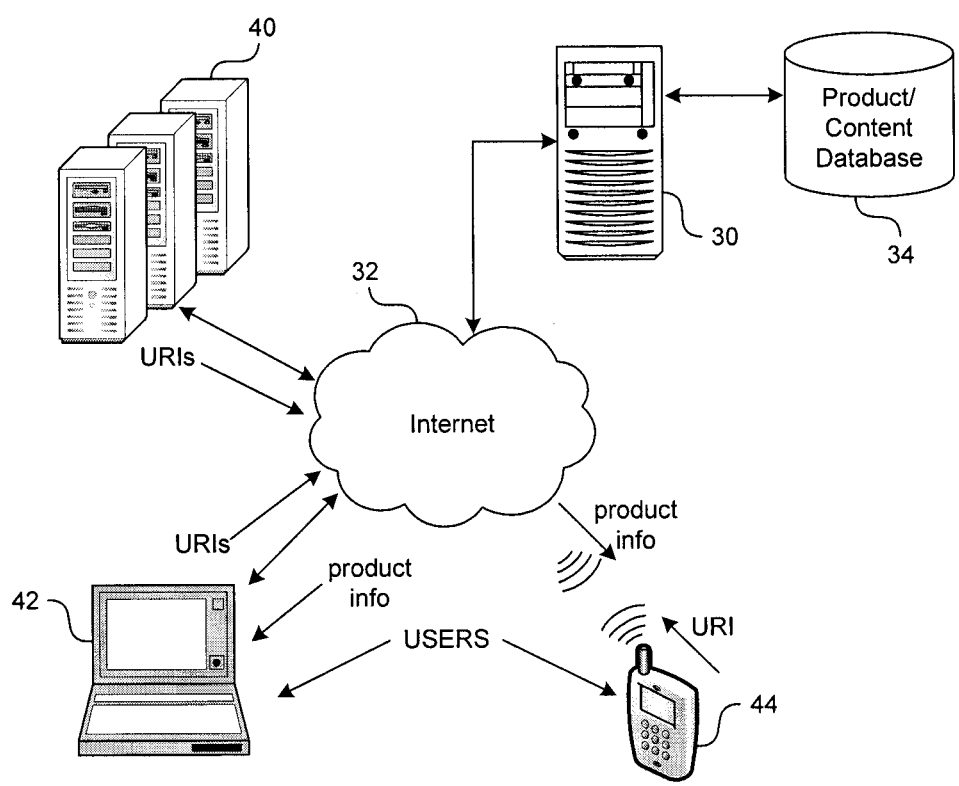
FIG. 2 illustrates an Internet-based system for associating stored product or content information with received URIs in accordance with an embodiment of the disclosed technology.

FIG. 2 illustrates a system in accordance with an embodiment of the disclosed technology for providing information regarding unique content that is associated with raw input URIs. The system includes one or more host computers 30 that are connected via a communication link to the Internet 32. The one or more host computers 30 are in communication with a local or remote database 34 that stores information about products or unique items of content. The host computer 30 can populate the database 34 with information in response to URIs received from other computers or programs, users who supply URIs such as via web forms or in response to URIs received from web crawling robots that access web sites 40 on the Internet 32.

Users can access the one or more host computers 30 from a fixed or mobile computer 42 (desktop, laptop, slate computer, kiosk etc.), from a mobile device, such as a smart phone 44, personal digital assistant (PDA), gaming system, or from some other communication/computing device etc.

In one embodiment, the user interacts with the host computer 30 through a web browsing application to provide an input URI to the host computer 30. In response to the URI supplied, the host computer 30 returns information regarding products or content to the user. The product information may include the name of a product, its current selling price and other vendors who are selling the same product. The user can then view all the resellers of the product in order to do comparative shopping. In an alternative embodiment, a manufacturer can supply URIs directed to their particular products and see the current price being asked for such products from each of their licensed (or unlicensed) retailers. In yet another embodiment, the host computer 30 employs web robots that scrape the web pages of a number of Internet sites to build an index of all the content available at the sites.

Figure 3:
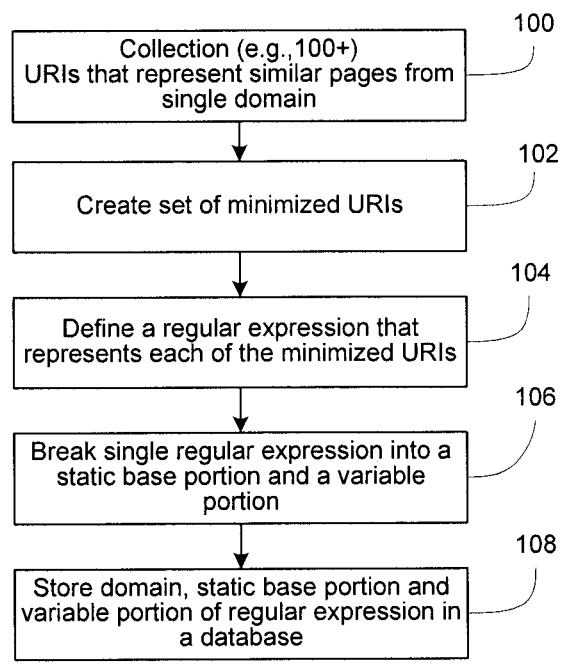
FIG. 3 illustrates a flowchart of steps performed to determine a regular expression for use in creating a prime URI from an input URI for a known domain in accordance with one embodiment of the disclosed technology.

FIG. 3 illustrates a sequence of steps that may be performed in accordance with one embodiment of the disclosed technology to associate information in a database with one or more URIs. In one embodiment, the computer system employs a regular expression to clean an input URI in order to generate a prime URI that references information in the database. Although the steps shown are described in a particular order, it will be appreciated that the steps may be performed in a different order or that different steps could be performed in order to achieve the functionality described. In one embodiment, each of the steps is performed by a programmed computer system executing a sequence of program instructions that are stored on a non-transitory computer-readable media in a manner well known to those of ordinary skill in the art.

Beginning at 100, a computer system receives a collection (i.e., a set) of URIs that represent similar web pages from a single Internet site. Such pages can be collected by hand from a variety of sources including Internet forums or from users. Alternatively, the collection of URIs could be received from a web crawling robot or from a commercial software program such as the Perl package www::mechanize. It is important that the collection contain a wide variation in the format of the URIs. Therefore, the collection should contain a large number of URIs, for example, 100 or more.

Each URI in the collection is analyzed to determine if the URI refers to the desired type of web page. For example, if products on buy pages are being indexed from a web site then each URI should reference a buy page. If a web page is found that represents a page with other information that is not relevant to the type of page being analyzed, then that URI should not be included in the set.

At 102, each of the URIs is minimized such that the URI cannot be further shortened or simplified and still refer to the same piece of unique content. At 104, a regular expression is determined that represents the minimized URIs. At 106, in accordance with one embodiment of the disclosed technology, the regular expression is divided into a static base portion (if any) for the domain of the web site in question and a variable portion. The domain, static base portion and the regular expression for a variable portion of the URI are stored in a database in association with the domain of the particular web site being indexed at 108.

Figure 4:
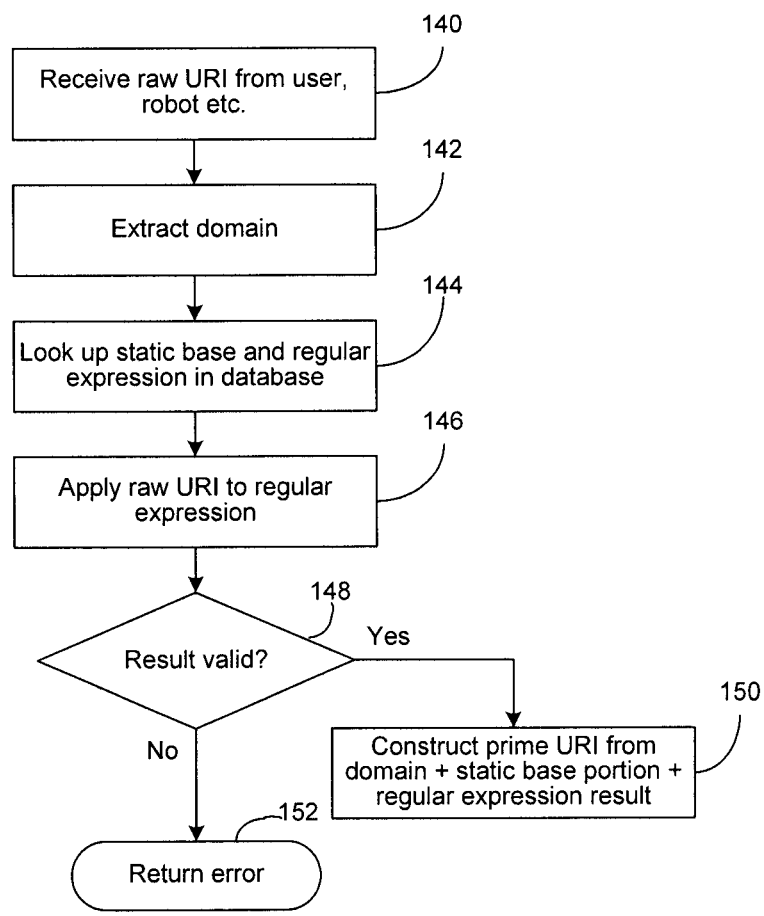
FIG. 4 is a flowchart of steps performed to create a prime URI from an input URI in accordance with an embodiment of the disclosed technology.

Once the domain and regular expression are determined for the web site being indexed, the information can be used to produce a "prime URI" that in turn references a unique entry in a corresponding database. As shown in FIG. 4, beginning at 140, a raw, input URI is received from a user, a web crawling robot or via some other means. At 142, in one embodiment of the disclosed technology, the raw URI is parsed to extract the domain within the raw URI. At 144, the static base portion and regular expression for the variable portion of the URI that is associated with the domain of the URI are retrieved from a database. Once the static base portion and regular expression are retrieved, the raw input URI is applied to the expression.

At 148, the regular expression is used to determine whether the raw URI supplied has the defined pattern of alphanumeric characters, numbers and/or symbols that represent a valid web page for the domain. If the raw input URI does have the defined pattern of characters, numbers or symbols, the regular expression will extract those symbols that are defined by the logic of the regular expression. The prime URI is therefore created at 150 by combining the domain, the static base portion (if any) and the results of the regular expression analysis that are determined by applying the input UR to the regular expression.

If the raw input URI does not have the defined pattern of alphanumeric characters, numbers or symbols specified by the logic of the regular expression, the computer returns an error message at 152 that informs the user (or a computer program that supplied the raw input URI) that the raw input URI does not represent a valid web page, that the web page cannot be found, or some other error message.

The following pseudo-code sets forth one method in accordance with an embodiment of the disclosed technology of determining a regular expression that can be used to index unique items of content available from a web site.

```
foreach $r (@R) {
    if (Similarity ($r)) {
        $m = Minimize ($r);
        if ($m) {
            push (@M, $m)
        }
    }
}
Sub Minimize($r){
    if (@Match = $r =~ /$Regex/g) {
        $r = join ("",$Static, @Match);
        return $r;
    }
    elseif (Is_Stable($Regex)) {
        return "";
    }
    $m = Exhaustively_Minimize ($r);
    $Regex = Trie ($Regex, $m);
    $Regex = Capture ($Regex);
    Return $m;
}
Sub Capture ($Regex) {
    Place_Parentheses_Along_Stopwords ($Regex);
}
```

The method illustrated in the pseudo code above analyzes each input URI ($r) in an array of URIs "@R". If a page referenced by the input URI is "similar" to that being analyzed (e.g. a buy page) then the URI is minimized as described below. If the minimized URI is not null, the URI is pushed into an array "@M".

The array @M contains a list of minimized URIs that all refer to the same class of web page (e.g. e-commerce buy pages). In one embodiment, the computer implements two functions to tell if web pages referenced by a URI are similar or are identical. The identical function can be performed, for example, by optical methods (e.g. does the rendered content on the page have the same appearance), source-defined methods (e.g. does a particular section of code on a web page match another section of code on another web page), or by a hybrid method that blends optical and source-defined methods. The similarity test can be a subset of the identical function that is less stringent. For example, two web pages may differ only in a price listed on the page. Therefore, the web pages are similar but not identical. The details of other techniques for minimizing a URI are set forth in further detail below.

As will be appreciated by those skilled in the art of computer science and web programming, a regular expression is a logical description of a string of letters, numbers and other characters. For purposes of the disclosed technology, regular expressions are determined that define a rule that represents each minimized URI as a sequence of alphanumeric characters or numbers or symbols. For example, a regular expression may indicate that a minimized URI must have a domain followed by a four digit number, a slash symbol "I" and be followed by a five letter string. Any input URI containing a pattern of letters and numbers is analyzed using the regular expression to determine if it matches the logic of the regular expression. Numerous programs are publicly available to create regular expressions that will match an input string.

In one embodiment, a Perl Compatible Regular Expression (PCRE) is used and the open source algorithm, Regexp::Trie (short for retrieval), is used to determine the regular expression that defines an input string. The details of creating and using regular expression are considered well known to those of ordinary skill in the art of computer science, web and database programming and are therefore not discussed in further detail except to the extent the regular expression is used with the disclosed technology.

Once the regular expression is known for a particular domain, the regular expression can be used to determine a prime URI for any input URI. The prime URI can than be used to index a database and return information about the unique piece of content referenced in the database. In one embodiment, supplied URIs can be used to continually update the regular expression. However, exhaustively minimizing a URI can be computationally intensive and can be dependent on delays at the host web site being indexed. Therefore, some embodiments of the disclosed technology limit the number of times URIs are exhaustively minimized.

In one embodiment, the minimize subroutine referenced in the pseudo code begins by applying the regular expression ($Regex) determined for the domain in question to the input URI. If the input URI meets the logical criteria of the regular expression, then the pattern match operation returns the string of characters that meet the logical criteria. For example, the regular expression Amazon.com/dp/([A-Z][{2})[0-9]{8} states that any URI must have the characters "Amazon.com/dp/" followed by two capital letters, followed by eight numbers. In this example, if an input URI meets the logical criteria, the regular expression may return a result such as "Amazon.com/dp/AB". If the input URI doesn't meet the logical criteria of the regular expression, the pattern match will return a false value.

In one embodiment, the regular expression for a domain may be divided into a static base portion of the URI and a part that returns a variable portion of the URI. Therefore the Join operation operates the reassemble the new or prime URI from the static base portion (if any) and the variable portion produced by applying the input URI to the regular expression $Regex. If the input URI meets the criteria defined by the regular expression, it is "cleaned" by the regular expression to produce the prime URI and returned.

If the input URI doesn't meet the logical conditions of the regular expression either the regular expression is not correct or the URI was not correct for the type of page being analyzed.

The Is_Stable routine operates to determine if the regular expression ($Regex) is being changed. Such an operation can be time-based such that the regular expression is allowed to be updated for a time period such as an hour, a day etc. after which the regular expression is no longer allowed to update. Other implementations may always allow the regular expression to update continually. Still other implementations may allow the regular expression to update depending on how a minimize URI routine is called.

If the regular expression is allowed to change (i.e. Is_Stable returns false), then the input URI is exhaustively minimized. There are a number of ways of exhaustively minimizing a URI. For example, in one embodiment, a product or other content, associated with an un-minimized URI is determined. For example, a computer can analyze an un-minimized URI to detect a unique product identifier on the corresponding web page referenced by the un-minimized URI. The identifier can be a manufacturer's product number, a UPC code, a stock keeping unit (SKU) code, bar code etc. Once a particular product (or unique piece of content) referenced by an un-minimized URI is determined, the URI can be shortened and a test performed to determine if the shortened URI still refers to the same product or content. The URI can be shortened by sequentially removing characters from the right hand end of the URI. Alternatively, the characters in the URI can be randomly removed.

In a currently preferred embodiment, the URI is shortened by removing characters after any special stop character in the URI. The special stop characters can be any non-alphanumeric character. Once it is determined that a shortened URI refers to the same product or content as the original un-minimized URI, any longer versions of the URI can be ignored.

There are a number of ways to determine if a shortened URI refers to the same product or content as the un-minimized URI. For example, a computer can compare the title of the HTML page that is returned for a shortened URI to the title of an HTML page returned for the un-minimized URI. Alternatively, if a shortened URI returns an error message, then it is known that the pages do not refer to the same product. Alternatively, a computer system can analyze product codes or images returned from both web pages. If the product code or largest image on each page is the same, then it is assumed that the shortened URI refers to the same product as the corresponding un-minimized URI.

Once the URI has been exhaustively minimized, the Trie regular expression generating routine (or similar routine) is called. The Trie routine returns a regular expression that logically describes the structure of the input URI.

The last step in the pseudo code is to modify the regular expression to capture the characters that meet the logical criteria. As will be understood by those of skill in the art, in a PCRE, this can be performed by adding parenthesis to the regular expression. In one embodiment, the parenthesis can be added around any stop characters in the URI.

For example, for the Internet retailer Amazon.com, a static base portion of a prime URI can be represented as "Amazon.com/dp/", which indicates that each product available on the Amazon.com website will be shown in a web page having this string of characters in its URI. Continuing with the example described above, the regular expression for the variable portion of the URI can be represented as "/dp/([A-Z]{2}[0-9]{8})". If a raw URI containing extraneous characters such as
   http://www.amazon.com/dp/BX00345678ENOZY4 simh
      gw p23 t2?pf rd m=ATVPD KIKX0 DER&pf rd
      s=center-2&
is supplied to the computer system, the URI cleaner will return "www.amazon.com/dp/BX00345678" as the prime URI that corresponds to the input URI. The prime URI can then be used to index a database for information about the unique product or content represented by the input raw URI.

The result of the pseudo code described above is a regular expression that logically describes each web page from a web site being indexed. The regular expression can be divided into a static base portion (e.g. amazon.com/dp/), if applicable, and a portion that logically describes the portion of the URI that changes with the particular piece of unique content shown in a web page. In addition, each of the minimized URIs that was analyzed is stored in the array @M. This array can be used for a variety of purposes. For example, each minimized URI in the array can be supplied to regular expression building program which should return a regular expression that is the same as the $Regex expression. If not, then an error may have occurred and the regular expression may need to be rebuilt.

As will be appreciated by those skilled in the art, the pseudo code described above operates in an in-line fashion to build and refine the regular expression. In another embodiment, the regular expression is built from a training set of minimized URIs. In this case, a regular expression that matches each minimized URI can be determined and then a single regular expression can be determined that logically describes each of the regular expressions determined for the minimized URIs. The single URI can then be divided by a computer into a static base portion (if applicable) and a regular expression that describes the varying portion of a URI. The static base portion and the regular expression can be stored in a database in association with a particular domain.

FIG. 5 illustrates one simplified example of a database structure 200 that could be used to store a domain, static base portion (if any) and regular expression for a variable portion of the URI for each of a number of Internet retailers. In this database 200, entries stored for each retailer may include the name of a retailer, an identification number for the retailer, the domain of the retailer, the static base portion of a prime URI and a regular expression calculated to determine the prime URIs as described above.

FIG. 6 illustrates a representative database 250 in which product information is stored such as a product identification number as well as a description of the product, its price and a current date at which the price was determined. The retailer name can be stored as well as a prime URI that references a particular product. Once a prime URI corresponding to the product is known, the prime URI can be used as a key to the database 250 to determine the corresponding product ID and other information about the product. Once the product ID is known, a computer system can display the price to a requestor or can search the database to retrieve information about other retailers where the product is available as well as the current price for the product asked by each of the retailers.

As will be appreciated from the above, the technology described provides a way to associate an input URI to a database entry by creating a prime or unique URI from the raw input URI. The prime URI can be used as a key in a database that stores information about a particular product or unique piece of content. Although the disclosed embodiments of the technology are described with respect to determining information about products shown on the buy pages of a web site being indexed, it will be appreciated that the disclosed technology can also be used to store and retrieve information about other things available on the Internet such as news articles, coupons, video clips or other items of unique content available on the Internet.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While the preferred embodiment of the technology has been disclosed, it will be appreciated that changes can be made without departing from the scope of the invention. Therefore the invention is to be determined solely from the following claims and equivalents thereto.

We claim:

1. A computer-based method for determining information about an item from a database in response to an input uniform resource identifier (URI), comprising:
   receiving, with a computer, one of a number of input URIs having the same domain that reference the same item on web pages of the domain;
   determining a static portion of a prime URI from a database that associates a static portion with the domain of the input URI;
   retrieving, with the computer, a pre-computed regular expression that is associated with the domain of the input URI and that operates to produce a dynamic portion of the prime URI;
   applying, with the computer, the retrieved regular expression to the input URI to produce the dynamic portion of the prime URI;
   joining, with the computer, the static and dynamic portions of the prime URI to complete the prime URI and using the completed prime URI as a key to access an entry associated with the item in a database that stores information for the item from multiple domains, wherein the information includes a product ID;
   retrieving, with the computer, information about the item associated with the domain of the input URI using the prime URI and information about the item that is associated with one or more other domains using the product ID; and
   presenting the retrieved information for the item.

2. The computer-based method of claim 1, further comprising:
   receiving, with the computer, input URIs that reference similar types of web pages from a domain;
   minimizing each input URI;
   determining, with the computer, a regular expression that logically defines each of the minimized URIs; and
   storing the regular expression in a computer readable memory for use with URIs from the corresponding domain.

3. The computer-based method of claim 2, further comprising:
   updating the regular expression in response to receiving input URIs associated with the domain.

4. A computer system for presenting information about an item referenced by an input uniform resource identifier (URI), comprising:
   processor electronics configured to perform operations of:
      receiving an input URI of a set of URIs having the same domain from a requestor, wherein each URI of the set of URIs references the same item on web pages of the domain;
      determining a static portion of a prime URI from a database that associates a static portion with the domain of the input URI;
      retrieving a pre-computed regular expression that is associated with the domain of the input URI;
      applying the retrieved regular expression to the input URI to produce a dynamic portion of the prime URI;
      joining the static and dynamic portions of the prime URI to complete the prime URI;
      using the completed prime URI as a key to an entry associated with the item in a database that stores information for the item from multiple domains, wherein the information includes a product ID;
      retrieving information about the item associated with the domain of the input URI using the prime URI and information about the item associated with the product ID for one or more other domains using the product ID; and
      supplying the retrieved information to the requestor.

5. The computer system of claim 4, wherein the computer system includes a memory and the processor is configured to store the regular expression in the memory in association with a domain.

6. The computer system of claim 4, wherein processor is configured to receive input URIs from browser programs associated with requestors.

7. The computer system of claim 4, wherein the processor is configured to receive input URIs from external computer programs.

8. The computer system of claim 7, wherein the external computer programs operate as web crawling robots.

9. A non-transitory, computer-readable media containing instructions that are executable by a computer to direct the computer to:
   receive an input URI of a set of uniform resource identifiers (URIs) having the same domain and that reference the same item on web pages of the domain;
   determine a static portion of a prime URI from a database that associates a static portion of a prime URI with the domain of the input URI;
   retrieve a pre-computed regular expression that is associated with the domain of the input URI;
   apply the retrieved regular expression to the input URI to produce a dynamic portion of the prime URI;
   join the static portion of the prime URI and the dynamic portion of the URI to complete the prime URI;
   use the completed prime URI as a key to an entry in a database that stores information about the item associated with the domain of the input URI, wherein the information includes a product ID;
   retrieve information about the item that is stored in the database that is associated with the domain of the input URI using the prime URI and information about the item that is associated with one or more other domains using the product ID; and
   present the retrieved information about the item.

10. The non-transitory, computer-readable media of claim 9, further including instructions that are executable by the computer to:
   receive, with the computer, input URIs that reference similar types of web pages from a domain;
   minimize each input URI;
   determine, with the computer, a regular expression that logically defines each of the minimized URIs; and
   store the regular expression in a computer readable memory for use with URIs from the corresponding domain.

11. The non-transitory, computer-readable media of claim 9, further including instructions that are executable by the computer to update the regular expression in response to receiving input URIs associated with the domain.

12. An Internet-based computer system for providing information about a product, comprising:
   a database that stores information about items, each item being referenced by a prime URI that serves as a key to the database for the information about the item that is associated with a domain of an input URI, wherein the information for the item includes a product ID;
   a processor programmed to:
      receive an input URI of a set of URIs that reference the same item on web pages of a domain of the input URI;

retrieve a static portion of a prime URI based on the domain of the input URI;

retrieve a pre-computed regular expression associated with the domain of the input URI that determines a dynamic portion of the prime URI;

apply the pre-computed regular expression to the input URI to produce the dynamic portion of the prime URI;

join the static and dynamic portions of the prime URI to complete the prime URI;

use the completed prime URI as a key to the database to retrieve information for the item that is associated with the domain of the input URI and a product ID for the item to retrieve information for the item that is associated with one or more other domains; and provide the retrieved item information to a requestor.

13. The Internet-based computer system of claim 12, wherein the input URI is received from a browser program associated with a user.

14. The Internet-based computer system of claim 12, wherein the input URI is received from a computer program that operates as a web crawling robot that scrapes web pages on the Internet.

15. The Internet-based computer system of claim 12, wherein the processor is programmed to determine the regular expression from minimized URIs from the domain.

16. An Internet-based computer system for providing information about a product, comprising:

a database that stores information about items, each item being referenced by a prime URI that serves as a key to the database for the information about the item that is associated with a domain of an input URI, wherein the information for the item includes a product ID;

a processor programmed to:

receive an input URI that references an item on a web page of a domain of the input URI;

determine a domain of the input URI;

retrieve a pre-computed regular expression associated with the domain of the input URI;

apply the retrieved regular expression to the input URI to produce a prime URI, wherein the prime URI cannot be further reduced and still refer to the same item on a web page of the domain of the input URI;

use the prime URI as a key to the database to retrieve information for the item that is associated with the domain of the input URI and a product ID for the item;

retrieve additional information for the item that is associated with one or more other domains using the product ID for the item; and provide the information about the item associated with the domain of the input URI and information about the item that is associated with one or more other domains to a requestor.

* * * * *